(12) United States Patent
Saddig et al.

(10) Patent No.: US 8,749,143 B1
(45) Date of Patent: Jun. 10, 2014

(54) AUTOMOTIVE LIGHTING DEVICE AND CONTROLLER

(71) Applicant: Lux Design LLC, North Haven, CT (US)

(72) Inventors: Marc D. Saddig, North Haven, CT (US); Stephen P. Ruscak, Littleton, MA (US)

(73) Assignee: Lux Design, LLC, North Haven, CT (US)

( * ) Notice: Subject to any disclaimer, the term of this patent is extended or adjusted under 35 U.S.C. 154(b) by 0 days.

(21) Appl. No.: 13/835,401

(22) Filed: Mar. 15, 2013

(51) Int. Cl.
*H05B 37/00* (2006.01)

(52) U.S. Cl.
USPC .............................................. 315/82; 315/291

(58) Field of Classification Search
USPC .......................................... 315/291, 82, 307
See application file for complete search history.

(56) References Cited

U.S. PATENT DOCUMENTS

| | | | |
|---|---|---|---|
| 2008/0253127 A1* | 10/2008 | Willwohl et al. | 362/294 |
| 2010/0052536 A1* | 3/2010 | Zielinski et al. | 315/77 |
| 2011/0248835 A1* | 10/2011 | Speegle et al. | 340/12.32 |

FOREIGN PATENT DOCUMENTS

EP  2408265 A2 *  1/2012

OTHER PUBLICATIONS

Lux Design LLP Web Page Advertisement for Angel Eye Bulb Replacement Model LUV H8 V3; Feb. 2011; Whole document.

* cited by examiner

*Primary Examiner* — Jimmy Vu
*Assistant Examiner* — Amy Yang
(74) *Attorney, Agent, or Firm* — Ware, Fressola, Maguire & Barber LLP (57) ABSTRACT

An automotive lighting device and controller is disclosed. The lighting device has a housing to be installed in a headlight fixture. The housing has white LEDs and blue LEDs mounted thereon. The controller uses one multi-pole switch to control the white light output of white LEDs and the blue light output of blue LEDs. The switch has settings configurable to select one of several intensity levels of blue light output and one of several intensity levels of white light output. The controller has a LED driver to provide current levels to the blue and white LEDs such that while the relative amount of light output between the blue light output and the white output are variable, the combined amount of blue light output and white light output remains substantially constant. The changes in the relative amount give rise to different color temperatures of the combined light output.

22 Claims, 11 Drawing Sheets

AUTOMOTIVE LIGHTING DEVICE AND CONTROLLER

FIELD OF THE INVENTION

The present invention relates generally to an automotive lighting device and an automotive lighting device controller configured to control the color temperature and/or intensity of the light output of an automotive headlight.

BACKGROUND OF THE INVENTION

Some automobiles have a pair of projection style headlights, known as corona rings or angel eyes, forming part of a headlight fixture. Angel-eyes headlights can use light-emitting diodes (LEDs) or incandescent lamps as a light source. The LEDs can enhance the lighting effect of the angel-eyes headlights. It would be desirable to provide a control device for changing the intensity and/or the color of the angel-eyes headlights according to the mood or taste of a car driver, for example.

SUMMARY OF THE INVENTION

The present invention is directed to an automotive lighting device and an automotive lighting device controller for controlling the intensity of the LEDs used in the angel-eyes headlight of a headlight fixture. The present invention is a plug-and-play type automotive lighting device since it can simply replace an existing automobile bulb/bulb assembly without the need for modifying the associated automobile fixture.

An embodiment of the present invention is an automotive lighting device controller comprising a switch having settings configurable to select one of a plurality of intensity levels associated with at least one light emitting diode of a first color and configurable to select one of a plurality of intensity levels associated with at least one light emitting diode of a second color, a first decoder in communication with said switch, the first decoder configured to generate a first decoder output associated with the selected intensity level of said at least one light emitting diode of the first color, a second decoder in communication with said switch, the second decoder configured to generate a second decoder output associated with the selected intensity level of said at least one light emitting diode of the second color, and a light emitting diode driver in communication with the first decoder and the second decoder, the driver configured to supply a first current level to said at least one light emitting diode of the first color based on the first decoder output of the first decoder and to supply a second current level to said at least one light emitting diode of the second color based on the second decoder output of the second decoder.

Another embodiment of the present invention is the automotive lighting device controller as described above, wherein said switch is a multi-pole switch.

A further embodiment of the present invention is the automotive lighting device controller as described above, wherein said switch comprises four single-pole, single-throw switches for providing four switch outputs, each switch output configured to provide a first value or a second value, and wherein said settings comprise a plurality of combinations of the first values and the second values from said switch outputs.

A still further embodiment of the present invention is the automotive lighting device controller as described above, wherein one of the combinations of the first values and the second values is provided to the first decoder and the second decoder, the first decoder configured to generate the first decoder output at least based on said one combination of the first values and the second values, the second decoder configured to generate the second decoder output at least based on said one combination of the first values and the second values.

Another embodiment of the present invention is the automotive lighting device controller as described above, wherein said four switch outputs comprise a first switch output, a second switch output, a third switch output and a fourth switch output, wherein the first switch output, the second switch output and third switch output are provided to the first decoder and the second decoder, wherein the first decoder is arranged to receive a plurality of first input voltage levels from a first voltage divider, the first decoder configured to generate the first decoder output at least based on the first input voltage levels and the first switch output, the second switch output and third switch output, and the second decoder is arranged to receive a plurality of second input voltage levels from a second voltage divider, the second decoder configured to generate the second decoder output at least based on the second input voltage levels and the first switch output, the second switch output and third switch output.

A further embodiment of the present invention is the automotive lighting device controller as described above, further comprising a power supply configured to receive a modulated voltage from a power source and to provide an input voltage to the light emitting diode driver, the light emitting diode driver configured to supply the first current level based on the first decoder output and the input voltage and the second current level based on the second decoder output and the input voltage.

A still further embodiment of the present invention is the automotive lighting device controller as described above, said at least one light emitting diode of the first color configured to produce a first light output based on the first current level, and said at least one light emitting diode of the second color configured to produce a second light output based on the second current level, such that a combined light output of the first light output and the second light output is substantially constant.

Another embodiment of the present invention is the automotive lighting device controller as described above, wherein a relative amount of light output between the first light output and the second light output is arranged to change based on a change from said one combination of the first values and the second values to another one of the plurality of combinations.

Another embodiment of the present invention is the automotive lighting device controller as described above, wherein said at least one light emitting diode of the first color comprises four blue light emitting diodes and said at least one light emitting diode of the second color comprises four white light emitting diodes, and wherein the combined light output has a color temperature, and a change in the relative amount of light output between the first light output and the second light output gives rise to a change in the color temperature.

A further embodiment of the present invention is the automotive lighting device controller as described above, wherein said at least one light emitting diode of the first color is configured to produce a first light output of blue light, and said at least one light emitting diode of the second color configured to produce a second light output of white light, wherein a combined light output of the first light output and the second light output is substantially constant and wherein said settings are arranged to provide up to nine different combinations of the first values and second values, each of the combinations give rises to a different relative amount of light output between the first light output and a second light output.

Another embodiment of the present invention is an automotive lighting device comprising at least one light emitting diode of a first color, at least one light emitting diode of a second color, a housing configured to mount thereon said at least one light emitting diode of the first color and said at least one light emitting diode of the second color, said housing configured to thermally dissipate heat generated by said light emitting diodes and also configured to be installed within a headlight fixture of an automobile, a switch having settings configurable to select one of a plurality of intensity levels associated with said at least one light emitting diode of the first color and configurable to select one of a plurality of intensity levels associated with said at least one light emitting diode of the second color, a first decoder in communication with said switch, the first decoder configured to generate a first decoder output associated with the selected intensity level of said at least one light emitting diode of the first color, a second decoder in communication with said switch, the second decoder configured to generate a second decoder output associated with the selected intensity level of said at least one light emitting diode of the second color, and a light emitting diode driver in communication with the first decoder and the second decoder and with said at least one light emitting diode of the first color and with said at least one light emitting diode of the second color, the driver configured to supply a first current level to said at least one light emitting diode of the first color based on the first decoder output of the first decoder and to supply a second current level to said at least one light emitting diode of the second color based on the second decoder output of the second decoder.

Another embodiment of the present invention is the automotive lighting device as described above, wherein said at least one light emitting diode of the first color comprises one or more blue emitting diodes and said at least one light emitting diode of the second color comprises one or more white emitting diodes.

A further embodiment of the present invention is the automotive lighting device as described above, wherein the housing comprises a plurality of heat fins configured to thermally dissipate the heat generated by said light emitting diodes.

A still further embodiment of the present invention is the automotive lighting device as described above, wherein the housing comprises a plurality of tabs to facilitate mounting of the housing to the headlight fixture.

Another embodiment of the present invention is the automotive lighting device as described above, wherein said switch comprises four single-pole, single-throw switches for providing four switch outputs, each switch output configured to provide a first value or a second value, and wherein said settings comprise a plurality of combinations of the first values and the second values from said switch outputs.

Another embodiment of the present invention is the automotive lighting device as described above, wherein one of the combinations of the first values and the second values are provided to the first decoder and the second decoder, the first decoder configured to generate the first decoder output at least based on said one combination of the first values and the second values, the second decoder configured to generate the second decoder output at least based on said one combination of the first values and the second values.

A further embodiment of the present invention is the automotive lighting device as described above, wherein said four switch outputs comprise a first switch output, a second switch output, a third switch output and a fourth switch output, wherein the first switch output, the second switch output and third switch output are provided to the first decoder and the second decoder, wherein the first decoder is arranged to receive a plurality of first input voltage levels from a first voltage divider, the first decoder configured to generate the first decoder output at least based on the first input voltage levels and the first switch output, the second switch output and third switch output, and the second decoder is arranged to receive a plurality of second input voltage levels from a second voltage divider, the second decoder configured to generate the second decoder output at least based on the second input voltage levels and the first switch output, the second switch output and third switch output.

A further embodiment of the present invention is the automotive lighting device as described above, further comprising a power supply configured to receive a modulated voltage from a power source and to provide an input voltage to the light emitting diode driver, the light emitting diode driver configured to supply the first current level based on the first decoder output and the input voltage and the second current level based on the second decoder output and the input voltage, and said at least one light emitting diode of the first color configure to produce a first light output based on the first current level, and said at least one light emitting diode of the second color configured to produce a second light output based on the second current level, such that a combined light output of the first light output and the second light output is substantially constant.

Another embodiment of the present invention is the automotive lighting device as described above, wherein a relative amount of light output between the first light output and the second light output is arranged to change based on a change from said one combination of the first values and the second values to another one of the combinations, and wherein said at least one light emitting diode of the first color comprises four blue light emitting diodes and said at least one light emitting diode of the second color comprises four white light emitting diodes, and wherein the combined light output has a color temperature, and a change in the relative amount of light output between the first light output and the second light output gives rise to a change in the color temperature.

A further embodiment of the present invention is the automotive lighting device as described above, wherein said switch comprises four single-pole, single-throw switches for providing four switch outputs, each output switch configured to provide a first value or a second value, and wherein said settings comprise a plurality of combinations of the first values and the second values from said switch outputs, and wherein said at least one light emitting diode of the first color configured to produce a first light output of blue light, and said at least one light emitting diode of the second color configured to produce a second light output of white light, wherein a combined light output of the first light output and the second light output is substantially constant and wherein said settings are configured to provide up to nine different combinations of the first values and second values, each of the combinations gives rise to a different relative amount of light output between the first light output and a second light output.

BRIEF DESCRIPTION OF THE DRAWINGS

FIGS. 4A to 4C show different parts of the input power processing circuit that provides input power to the automotive lighting device controller, according to an embodiment of the present invention.

FIG. 5 is a circuit diagram of the LED driver, according to an embodiment of the present invention.

DETAILED DESCRIPTION OF THE INVENTION

Figure 1:
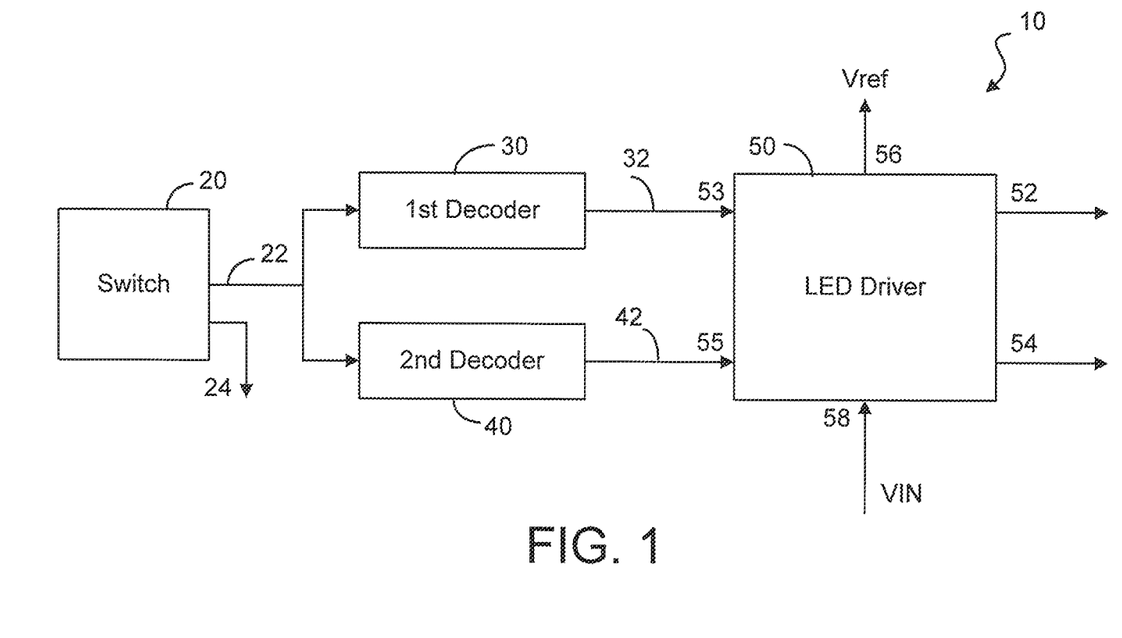
FIG. 1 is a block diagram showing the automotive lighting device controller, according to an embodiment of the present invention.
Figure 9:
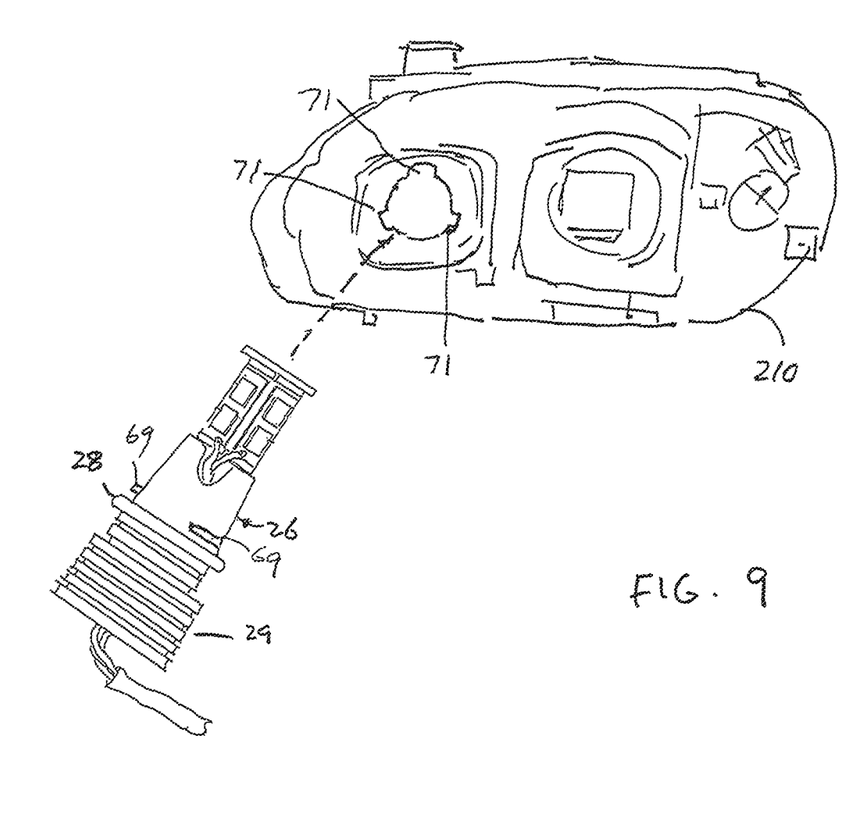
FIG. 9 is a schematic diagram showing a headlight fixture for installing the housing of the automotive lighting device of FIG. 8.

As seen in FIG. 1, an automotive lighting device controller 10, according to an embodiment of the present invention uses a switch 20 to select the intensity of the light output of two light sources used in a headlight fixture 210 (see FIG. 9). The two light sources may be arranged to emit light of different colors. Thus, the automotive lighting device controller 10 is configured to control the color temperature of the light output of the headlight fixture. In particular, one of the light sources comprises one or more light-emitting diodes (LEDs) configured to emit light of a first color, and the other light source comprises one or more light-emitting diodes configured to emit light of a different second color. The first color can be blue and the second color can be white, for example. The blue light-emitting diodes and the white light-emitting diodes are shown as BLUE LEDs 62 and WHITE LEDs 64 in FIGS. 7A and 7B. The switch 20 has settings configurable to one of a plurality of intensity levels associated with LEDs of the first color and settings configurable to one of a plurality of intensity levels associated with LEDs of the second color.

Figure 8:
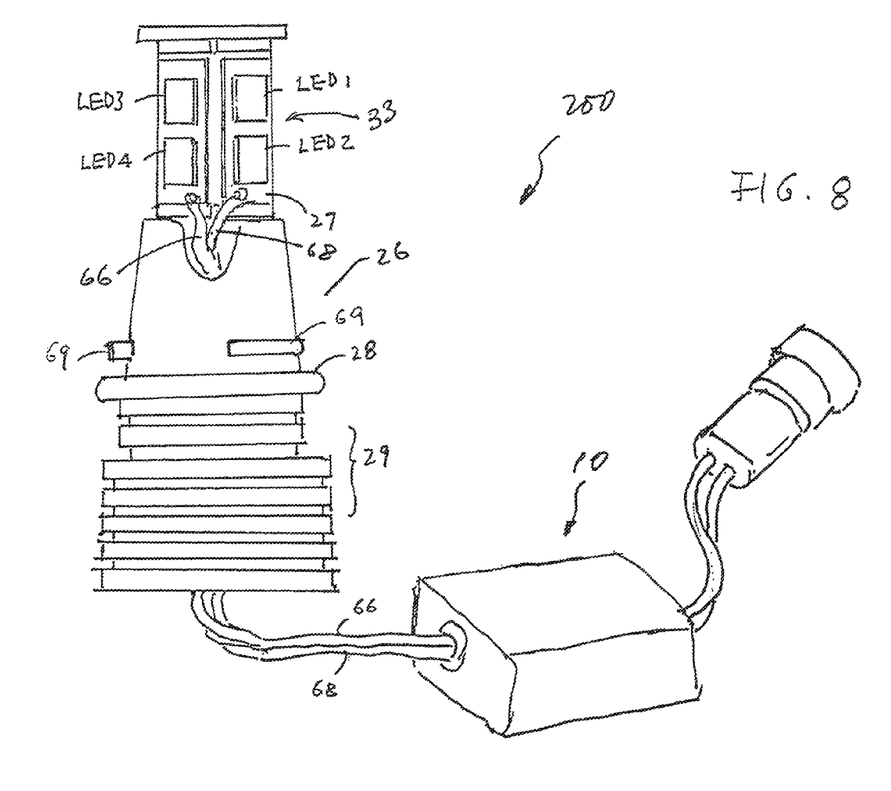
FIG. 8 is a schematic diagram showing the automotive lighting device, according to an embodiment of the present invention.

As shown in FIG. 1, the automotive lighting device controller 10 comprises an LED driver 50 having a first output terminal 52 and a second output terminal 54. As seen in FIG. 8, these output terminals are supplied to the LEDs via wire cables 66 and 68. Based on an input at a first input 53, the first output terminal 52 is arranged to supply a power level to the LEDs of the first color. Based on an input at a second input 55, the second output terminal 54 is arranged to supply a power level to the LEDs of the second color. The automotive lighting device controller 10 has a switch 20 with a plurality of outputs 22, 24 to provide a set of binary codes representing the intensity levels associated with the two light sources. The automotive lighting device controller 10 also has a first decoder 30 and a second decoder 40 in communication with the switch 20. Based on the binary codes provided by the switch 20, the first decoder 30 generates and provides a first decoder output 32 to the first input 53 of the LED driver 50, and the second decoder 40 generates and provides a second decoder output 43 to the second input 55 of the LED driver 50. The LED driver 50 has a power input terminal 58 to receive an input voltage VIN (see FIG. 5) and a reference voltage output terminal 56 to provide a reference voltage Vref.

Figure 2:
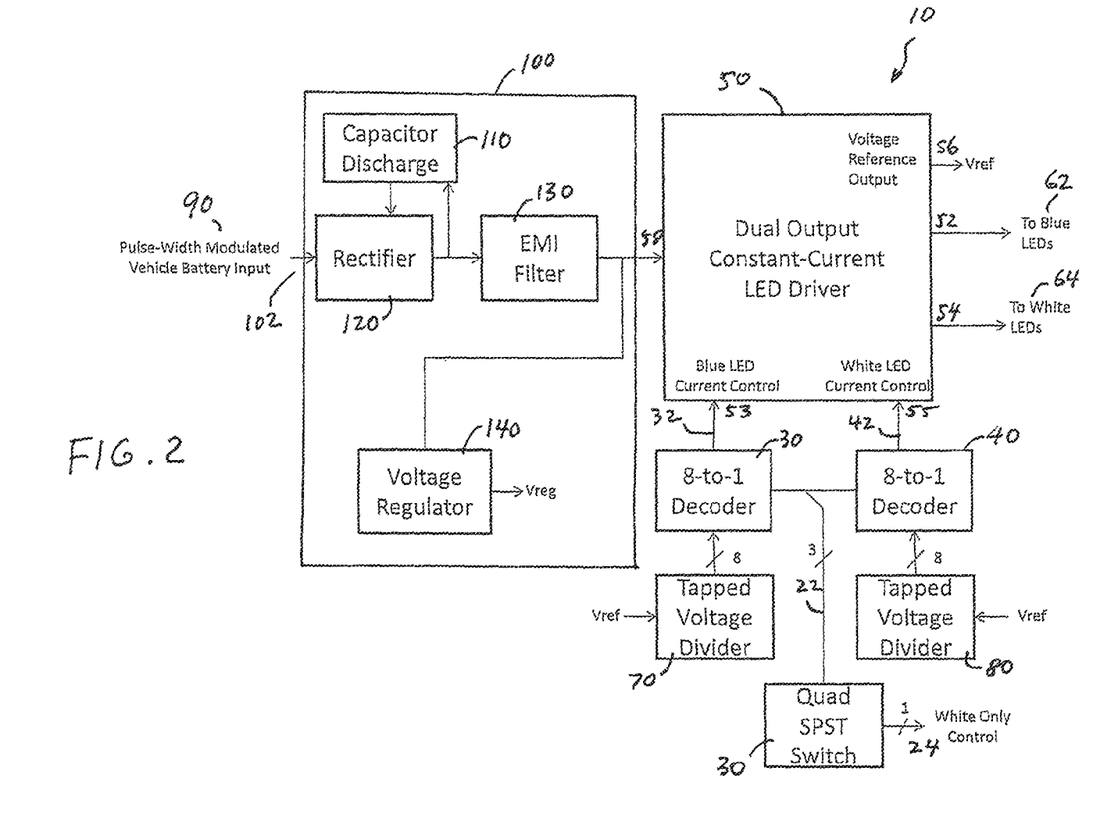
FIG. 2 is a block diagram showing a more detailed structure of the automotive lighting device controller of FIG. 1.
Figure 3:
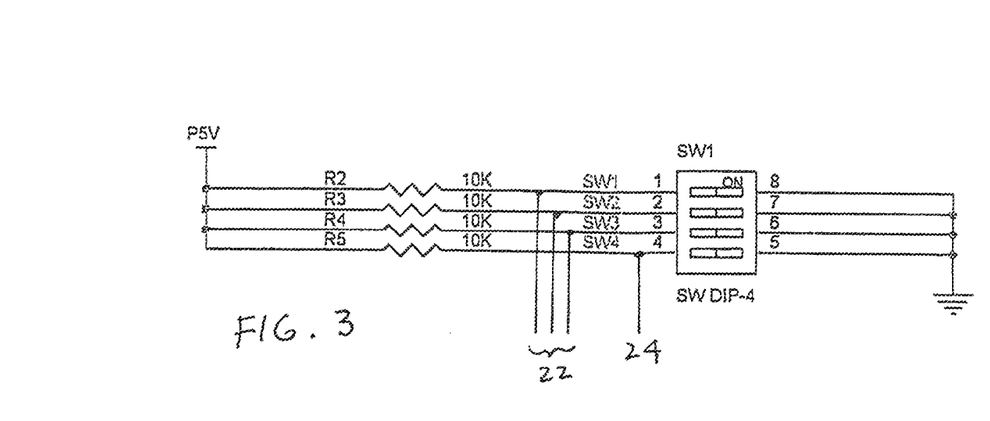
FIG. 3 shows a QUAD SPST switch for use in the automotive lighting device, according to an embodiment of the present invention.

FIG. 2 is a block diagram showing a more detailed structure of the automotive lighting device controller 10, according to an embodiment of the present invention. In one embodiment of the present invention, the LEDs of the first color are blue LEDs 62 and the LEDs of the second color are white LEDs 64 (see FIGS. 7A and 7B). The switch 20, according to one embodiment of the present invention, is a multi-pole switch, such as a QUAD SPST (single-pole single-throw) switch. The QUAD SPST switch has four dual in-line (DIP) switches SW1, SW2, SW3 and SW4, each of which has a switch output that can be switched to an "ON" position or an "OFF" so that the switch 20 can be arranged to provide a set of binary codes of four digits. In one embodiment of the present invention, the first three digits of binary codes from SW1, SW2 and SW3, denoted as switch output 22, are communicated to the first and second decoders 30, 40 (see FIG. 3). The one-digit binary code from SW4, denoted as switch output 24, is provided to the LEDs of the first color (see FIG. 7A). As shown in FIG. 2, the first decoder 30 is an 8-to-1 decoder configured to receive eight input-voltage levels from a first tapped voltage divider 70, and the second decoder 30 is an 8-to-1 decoder configured to receive eight input-voltage levels from a second tapped voltage divider 80. The LED driver 50 is arranged to receive at the power input terminal 58 the input voltage VIN from a power supply 100. The power supply 100 is configured to receive at battery input 102 a pulse-width modulated voltage from a pulse-width modulated vehicle battery input 90. The power supply 100 has a rectifier 120, an electromagnetic interference (EMI) filter 130 as shown in FIG. 4A; a capacitor discharge circuit 110 as shown in FIG. 4B; and a +5V regulator 140 as shown in FIG. 4C.

Figure 4A:
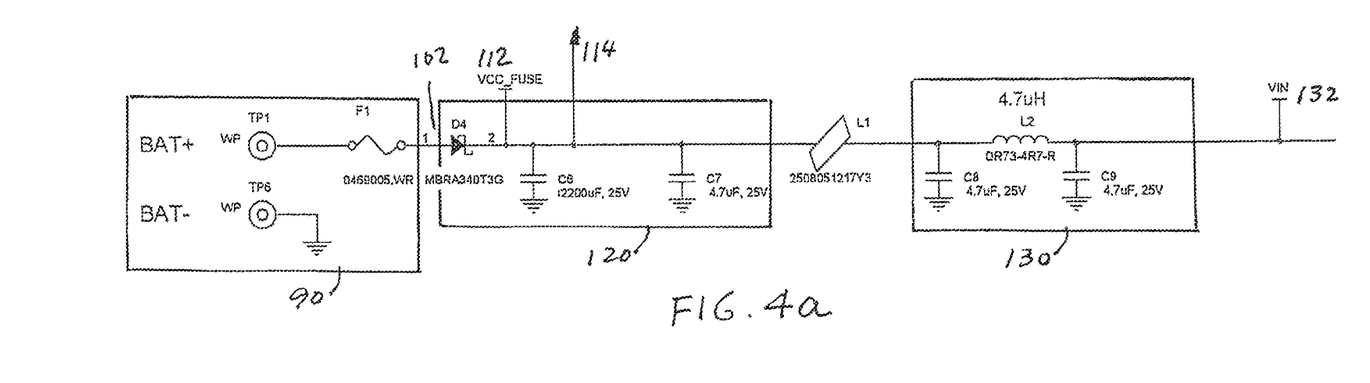
Figure 4B:
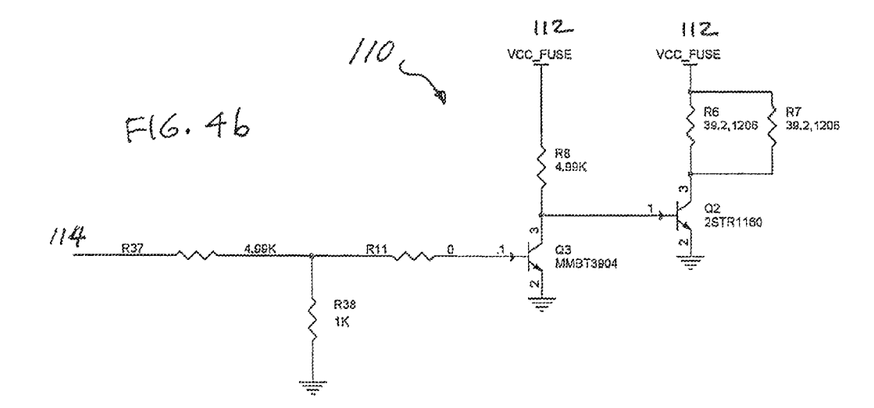
Figure 4C:
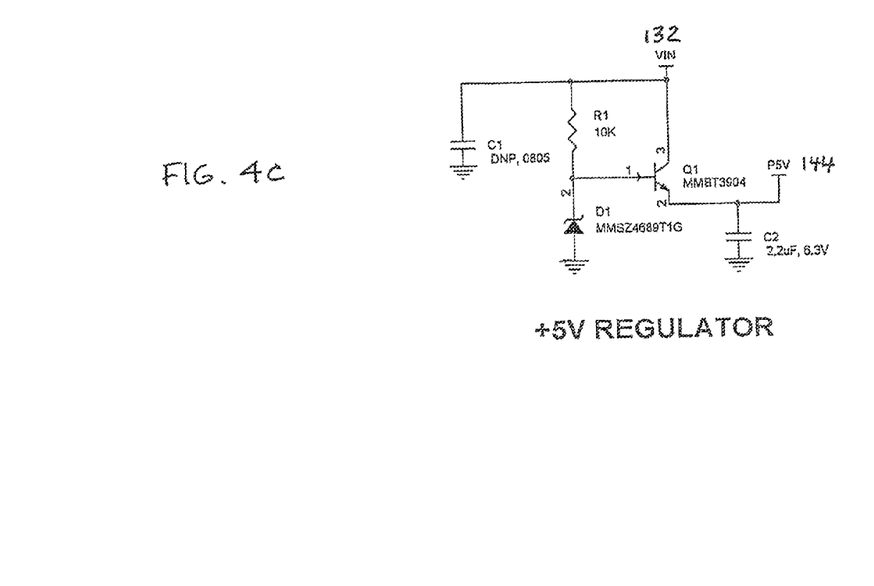

As shown in FIG. 4A, the vehicle battery input 90 has two terminals WP configured for connection to a pulse-width modulated battery power supply (not shown). The positive terminal of the battery power supply is connected to the rectifier 120 through a fuse F1. The negative terminal of the battery power supply is connected to ground. The rectifier 120 is arranged to provide an output voltage 114 to the capacitor discharge circuit 100, and to receive a feedback voltage 112 (VCC_FUSE) from the capacitor discharger circuit 110 (see FIG. 4B). The output voltage from the rectifier 120 is provided to the EMI filter 130 via a multi-layer chip bead configured to suppress conducted EMI signals. The EMI filter 130 is configured to provide a filtered voltage 132 as the input voltage VIN to the LED driver 50. As shown in FIG. 4C, the +5V regulator 140 provides a regulated voltage 144 (Vreg or P5V).

As shown in FIG. 5, the LED driver 50 uses a dual step-down driver 51 as its main circuit, for example. Two input pins of the step-down driver 51 are used as the first and second inputs 53, 55 of the LED driver 50. The first input 53 is configured to receive the first output 32 from the first decoder 30, and the second input 55 is configured to receive the second output 42 from the second decoder 40 as shown in FIG. 2. Two output pins of the step-down driver 51 are used as the first and second output terminals 52, 54 of the LED driver 50. The first output terminal 52 is configured to provide electrical current to the blue LEDs 62 and the second output terminal 54 is configured to provide electrical current to the white LEDs 64 (see FIG. 2). This current thus represents the power delivered to the LEDs since the voltage drop of the LEDs when forwardly biased (i.e., are ON or lit) is relatively constant. Two voltage input pins of the step-down driver 51 are used as the power input terminal 58 of the LED driver 50. The power input terminal 58 is configured to receive the filtered voltage 132 (VIN) from the EMI filter 130 (see FIG. 4A). A voltage output pin of the step-down driver 51 is used as the reference voltage output terminal 56 to provide the reference voltage Vref to the tapped voltage drivers 70, 80 (see FIGS. 6A and 6B). The reference voltage Vref and an enable signal 41 (see FIGS. 6B and 7A) are provided to an N-channel MOSFET (2N7002) for conditioning the voltage received at the second input 55.

Figure 6:
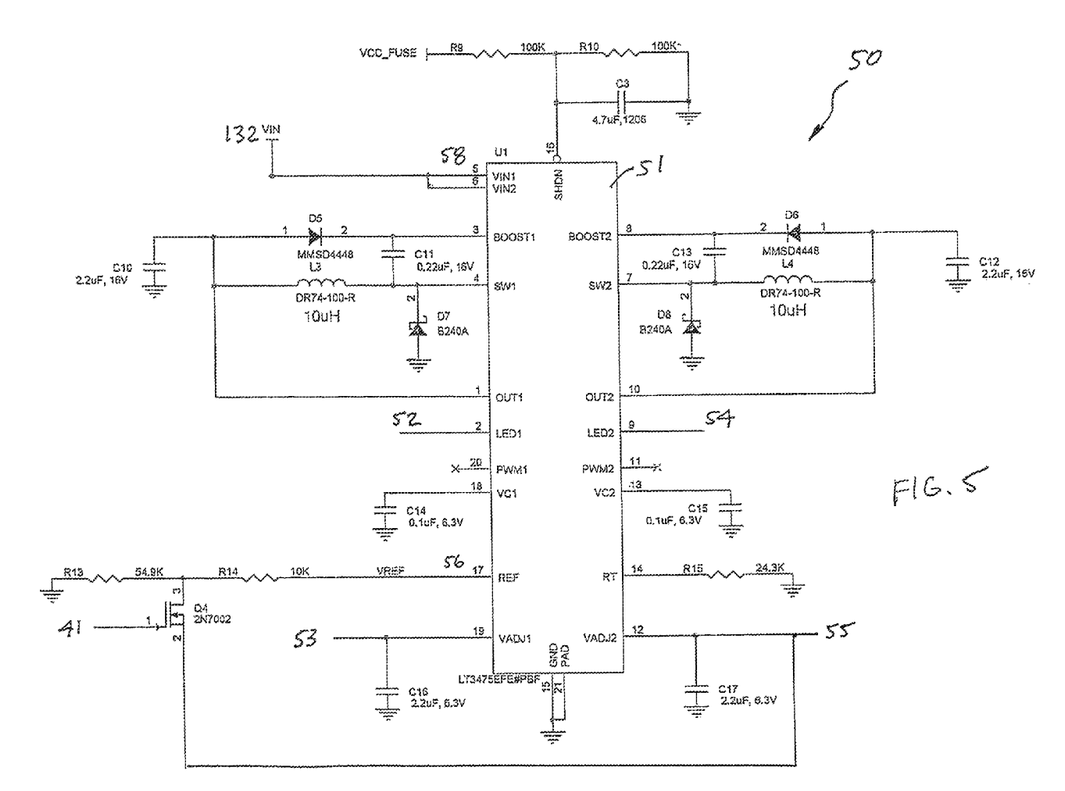
FIGS. 6A and 6B are circuit diagrams of the decoders for use in the automotive light device controller, according to the present invention.
Figure 6A:
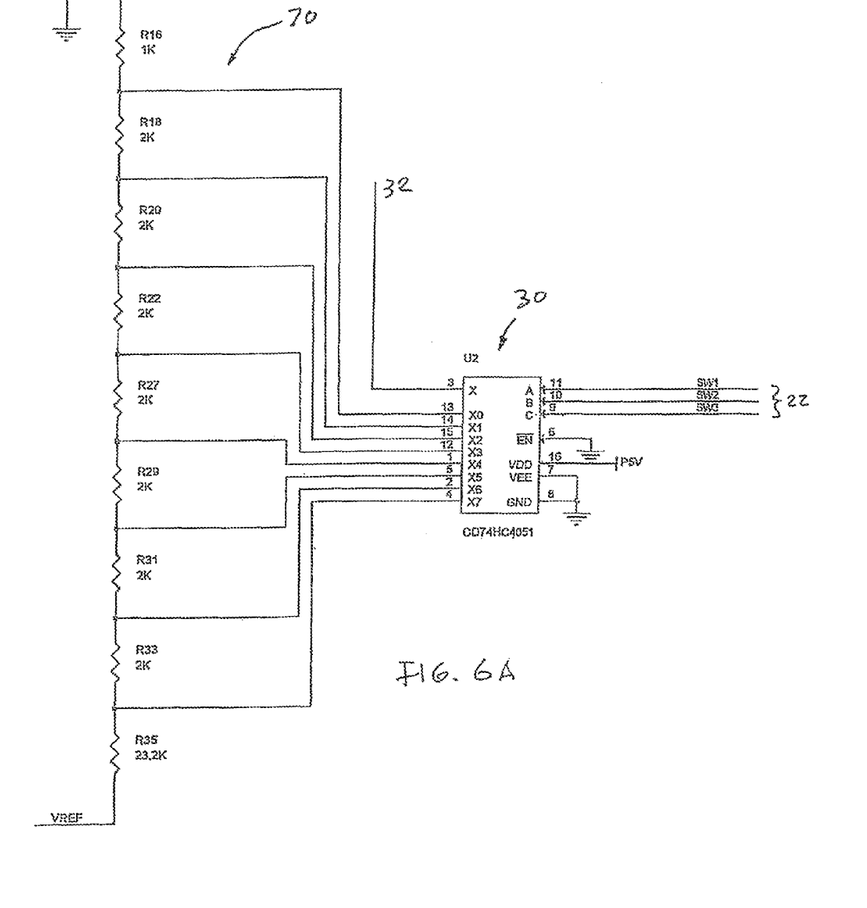

As shown in FIG. 6A, the first tapped voltage divider 70, based on the reference voltage Vref from the LED driver 50, provides eight voltage levels to the first decoder 30. Based on the binary codes from the output 22 of the switch 20 and the eight voltage levels received from the first tapped voltage divider 70, the first decoder 30 provides the first output 32 to the first input 53 of the LED driver 50 (see FIG. 2).

Figure 6B:
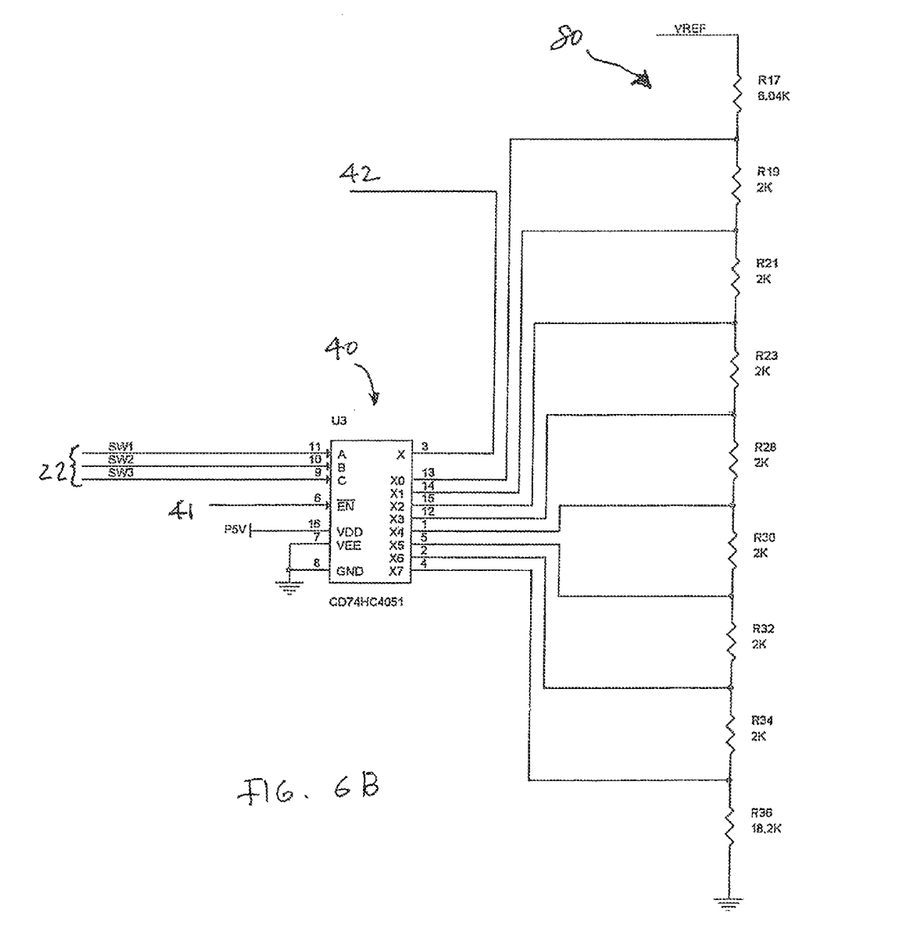

As shown in FIG. 6B, the second tapped voltage divider 80, based on the reference voltage Vref, provides eight voltage levels to the second decoder 40. Based on the binary codes from the output 22 of the switch 20 and the eight voltage levels received from the second tapped voltage divider 80, the second decoder 40 provides the second output 42 to the second input 55 of the LED driver 50 (see FIG. 2). The second decoder 40 also receives an enable signal 41 from the blue LEDs 62 (see FIG. 7A).

Figure 7A:
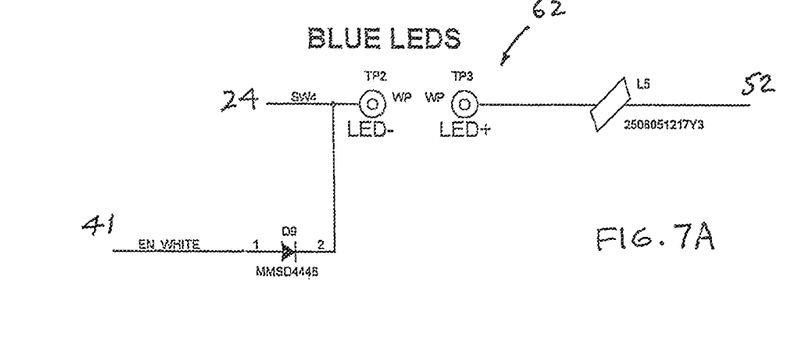
FIGS. 7A and 7B are schematic diagrams showing how the LEDs are electrically connected to the power provided by the automotive light device controller, according to an embodiment of the present invention.

As shown in FIG. 7A, each of the blue LEDs 62 has a negative diode end arranged to receive a voltage associated with the output 24 from the switch 20 (FIG. 2), and a positive diode end arranged to receive the power level provided by the first output terminal 52 of the LED driver 50 (see FIG. 2) via a conducted EMI signal suppressor. The voltage level at the negative diode end is also tied to the enable signal 41 at the second decoder 40 (see FIG. 6B).

Figure 7B:
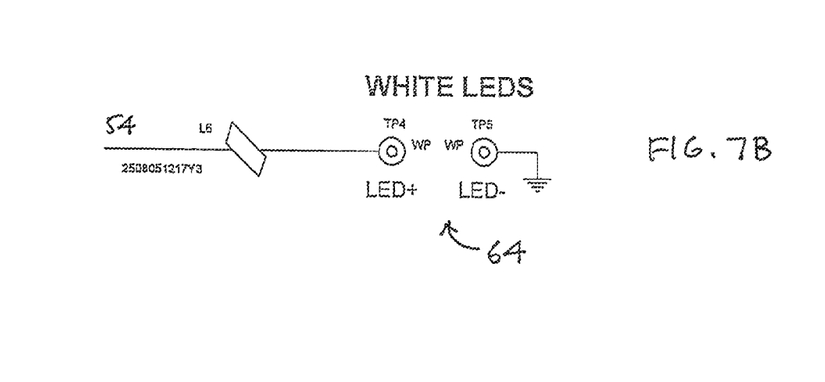

As shown in FIG. 7B, each of the white LEDs 64 has a negative diode end connected to ground, and a positive diode end arranged to receive the power level provided by the second output terminal 54 of the LED driver 50 (see FIG. 2) via a conducted EMI signal suppressor.

In summary, the automotive lighting device controller 10, according to an embodiment of the present invention, can use a dip-switch style switch to individually select the intensity of the white and blue LEDs. According to this embodiment, eight LEDs are used: four blue LEDs and four white LEDs. The dip switches in switch 20 control an analog-to-digital output device which, in turn, adjusts resistance values. The different resistance values determine the current output of an LED driver, making the LEDs dimmer or brighter. Adjusting one of the dip switches (from OFF to ON, for example) will increase the light output of the white LEDs while decreasing the light output of the blue LEDs substantially in equal amount. Likewise, changing one dip switch from ON to OFF will decrease the current output of the white LEDs while increasing the current output of the blue LEDs. As such, the total combined current output of the blue and white LEDs is substantially constant thereby ensuring that the overall lighting device does not overheat. Thus, using one switch to control both strings of white LEDs and blue LEDs ensures that the light source unit does not get driven too hard which would produces excessive heat and lead to an early failure of the lighting device. By keeping the total combined output of the blue and white LEDs constant while changing the relative amount between the blue light and white light, one effectively changes the color temperature of the combined light output. For example, if all four switches SW1, SW2, SW3 and SW4 of the switch 20 are switched to the "ON" position, the output of the blue LEDs is minimum while the output of the white LEDs is maximum. The color temperature of the combined output at this switching setting is about 5,200 degrees K. When the switches SW1, SW2, SW3 are switched to the "OFF" position and SW4 is switched to the "ON" position, the output of the blue LEDs is maximum while the output of the white LEDs is minimum. The color temperature of the combined output at this setting is about 12,000 degrees K. When SW4 is switched to the "OFF" position, the blue LEDs are turned off while the output of the white LEDs is maximum, yielding a color temperature of 5,000 degrees K. If the binary code is "1" (first value) for "ON" and "0" (second value) for "OFF", the relationship between the binary codes and the color temperatures are as follows:

| SW1 | SW2 | SW3 | SW4 | Color Temperature (degrees K) |
|---|---|---|---|---|
| 0 | 0 | 0 | 1 | 12,000 |
| 1 | 0 | 0 | 1 | 10,000 |
| 0 | 1 | 0 | 1 | 8,800 |
| 1 | 1 | 0 | 1 | 7,800 |
| 0 | 0 | 1 | 1 | 6,900 |
| 1 | 0 | 1 | 1 | 6,300 |
| 0 | 1 | 1 | 1 | 5,700 |
| 1 | 1 | 1 | 1 | 5,200 |
| X | X | X | 0 | 5,000 |

X = don't care

The automotive lighting device controller 10 can be used to control the LEDs for angel-eyes lights of an automobile headlight fixture, such as those found on BMW automobiles. Thus, the automotive lighting device controller 10 can be part of an automotive lighting device 200 as shown in FIG. 8. As seen in FIG. 9, such automobile lighting device is designed to replace an existing automobile bulb or bulb assembly without the need for modifying the automobile headlight fixture 210.

As shown in FIG. 8, the automotive lighting device 200 comprises a housing 26 and an automotive lighting device controller 10, including the power supply 100 and the pulse-width modulated vehicle battery input 90 as shown in FIGS. 2 and 4A. The housing 26 has a region 33 to which the LEDs on circuit boards 27 are mounted. As seen in the view as shown FIG. 8, LED1, LED2, LED3 and LED4 are mounted to one or more circuit boards 27 having electrical cables 66 and 68 connected to the automotive lighting device controller 10. Four other LEDs are mounted to the opposite side of region 33 that are not visible in the figure. In one embodiment of the present invention, LED1 and LED2 are white LEDs, and LED3 and LED4 are blue LEDs, for example (see FIGS. 7A and 7B). In another embodiment of the present invention, LED1, LED2, LED3 and LED4 are all white LEDs. As shown in FIG. 8, housing 26 also comprises an O-ring 28 and a plurality of heat fins 29. The circuit boards 27 are typically thermally bonded to housing 26. This bonding provides for thermal transfer of the heat generated by the LEDs to housing 26 for radiative and convection cooling, especially via heat fins 29.

Figure 10:
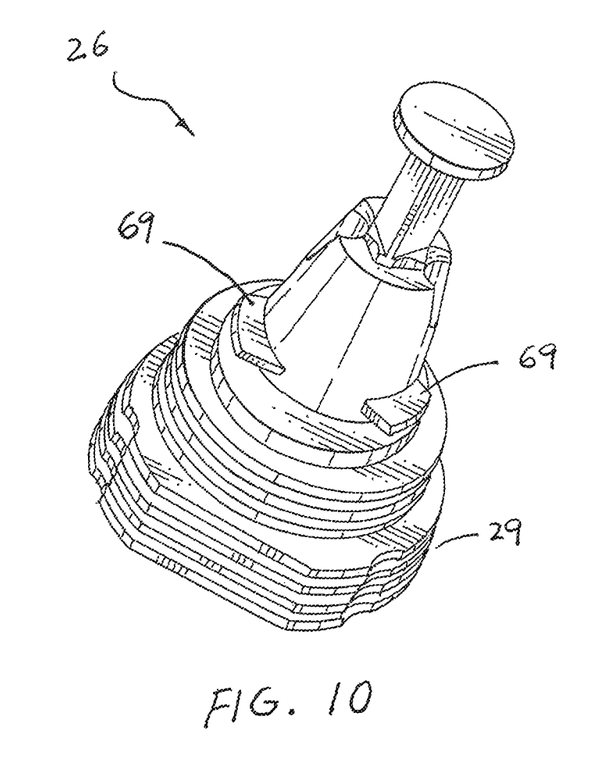
FIG. 10 is a perspective view of a housing, according to an embodiment of the present invention.

As shown in FIG. 9, the housing 26 is configured to be installed within a headlight fixture 210 of an automobile. In particular, the housing 26 is installed within the fixture that provides an angel eyes headlight. Tabs 69 on housing 26 can be used to facilitate mounting of housing 26 to the headlight fixture 210 via slots 71 in the headlight fixture. FIG. 10 shows the housing 26, including tabs 69 before mounting of LEDs 62, 64 (see FIGS. 7A and 7B).

It is understood that, in the view as shown in FIG. 8, only four LEDs are visible and four more LEDs are hidden. It is also understood that the number of LEDs in each headlamp can be one, two, four, six, eight or more, depending on the design of the LEDs and the light intensity of the LEDs.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. An automotive lighting device controller comprising:
   a switch having settings configurable to select one of a plurality of intensity levels associated with at least one light emitting diode of a first color and configurable to select one of a plurality of intensity levels associated with at least one light emitting diode of a second color;
   a first decoder in communication with said switch, the first decoder configured to generate a first decoder output associated with the selected intensity level of said at least one light emitting diode of the first color;
   a second decoder in communication with said switch, the second decoder configured to generate a second decoder output associated with the selected intensity level of said at least one light emitting diode of the second color; and
   a light emitting diode driver in communication with the first decoder and the second decoder, the driver configured to supply a first current level to said at least one light emitting diode of the first color based on the first decoder output of the first decoder and to supply a second current level to said at least one light emitting diode of the second color based on the second decoder output of the second decoder, wherein
   the first decoder is arranged to receive a plurality of first input voltage levels from a first voltage divider, the first decoder configured to generate the first decoder output at least based on one of the plurality of first input voltage levels, said one of the plurality of first input voltage levels selected by the first decoder based on said switch settings associated with said at least one light emitting diode of the first color, and
   the second decoder is arranged to receive a plurality of second input voltage levels from a second voltage divider, the second decoder configured to generate the second decoder output at least based on one of the plurality of second input voltage levels, said one of the plurality of second input voltage levels selected by the second decoder based on said switch settings associated with said at least one light emitting diode of the second color.

2. The automotive lighting device controller according to claim 1, wherein said switch is a multi-pole switch.

3. An automotive lighting device controller comprising:
   a switch having settings configurable to select one of a plurality of intensity levels associated with at least one light emitting diode of a first color and configurable to select one of a plurality of intensity levels associated with at least one light emitting diode of a second color;
   a first decoder in communication with said switch, the first decoder configured to generate a first decoder output associated with the selected intensity level of said at least one light emitting diode of the first color;
   a second decoder in communication with said switch, the second decoder configured to generate a second decoder output associated with the selected intensity level of said at least one light emitting diode of the second color; and
   a light emitting diode driver in communication with the first decoder and the second decoder, the driver configured to supply a first current level to said at least one light emitting diode of the first color based on the first decoder output of the first decoder and to supply a second current level to said at least one light emitting diode of the second color based on the second decoder output of the second decoder, wherein said at least one light emitting diode of the first color configured to produce a first light output based on the first current level, and said at least one light emitting diode of the second color configured to produce a second light output based on the second current level, such that a combined light output of the first light output and the second light output is substantially constant.

4. The automotive lighting device controller according to claim 3, wherein said switch comprises four single-pole, single-throw switches for providing four switch outputs, each switch output configured to provide a first value or a second value, and wherein said settings comprise a plurality of combinations of the first values and the second values from said switch outputs.

5. The automotive lighting device controller according to claim 4, wherein one of the combinations of the first values and the second values is provided to the first decoder and the second decoder, the first decoder configured to generate the first decoder output at least based on said one combination of the first values and the second values, the second decoder configured to generate the second decoder output at least based on said one combination of the first values and the second values.

6. The automotive lighting device controller according to claim 5, wherein said four switch outputs comprise a first switch output, a second switch output, a third switch output and a fourth switch output, wherein the first switch output, the second switch output and third switch output are provided to the first decoder and the second decoder, wherein
   the first decoder is arranged to receive a plurality of first input voltage levels from a first voltage divider, the first decoder configured to generate the first decoder output at least based on one of the first input voltage levels, said one of the first input voltage levels selected by the first decoder based on said switch settings associated with said at least one light emitting diode of the first color, and
   the second decoder is arranged to receive a plurality of second input voltage levels from a second voltage divider, the second decoder configured to generate the second decoder output at least based on one of the second input voltage levels, said one of the second input voltage levels selected by the second decoder based on said switch settings associated with said at least one light emitting diode of the second color.

7. The automotive lighting device controller according to claim 6, further comprising:
   a power supply configured to receive a modulated voltage from a power source and to provide an input voltage to the light emitting diode driver, the light emitting diode driver configured to supply the first current level based on the first decoder output and the input voltage and the second current level based on the second decoder output and the input voltage.

8. The automotive lighting device controller according to claim 4, wherein said at least one light emitting diode of the first color is configured to produce a first light output of blue light, and said at least one light emitting diode of the second color configured to produce a second light output of white light, wherein a combined light output of the first light output and the second light output is substantially constant and wherein said settings are arranged to provide up to nine different combinations of the first values and second values, each of the combinations give rises to a different relative amount of light output between the first light output and a second light output.

9. The automotive lighting device controller according to claim 3, wherein said switch comprises four single-pole, single-throw switches for providing four switch outputs, each switch output configured to provide a first value or a second value, and wherein said settings comprise a plurality of combinations of the first values and the second values from said switch outputs, wherein a relative amount of light output between the first light output and the second light output is arranged to change based on a change from said one combination of the first values and the second values to another one of the plurality of combinations.

10. The automotive lighting device controller according to claim 9, wherein said at least one light emitting diode of the first color comprises four blue light emitting diodes and said at least one light emitting diode of the second color comprises four white light emitting diodes, and wherein the combined light output has a color temperature, and a change in the relative amount of light output between the first light output and the second light output gives rise to a change in the color temperature.

11. An automotive lighting device comprising:
at least one light emitting diode of a first color;
at least one light emitting diode of a second color;
a housing configured to mount thereon said at least one light emitting diode of the first color and said at least one light emitting diode of the second color, said housing configured to thermally dissipate heat generated by said light emitting diodes and also configured to be installed within a headlight fixture of an automobile;
a switch having settings configurable to select one of a plurality of intensity levels associated with said at least one light emitting diode of the first color and configurable to select one of a plurality of intensity levels associated with said at least one light emitting diode of the second color;
a first decoder in communication with said switch, the first decoder configured to generate a first decoder output associated with the selected intensity level of said at least one light emitting diode of the first color;
a second decoder in communication with said switch, the second decoder configured to generate a second decoder output associated with the selected intensity level of said at least one light emitting diode of the second color;
a light emitting diode driver in communication with the first decoder and the second decoder and with said at least one light emitting diode of the first color and with said at least one light emitting diode of the second color, the driver configured to supply a first current level to said at least one light emitting diode of the first color based on the first decoder output of the first decoder and to supply a second current level to said at least one light emitting diode of the second color based on the second decoder output of the second decoder, and
a power supply configured to receive a voltage from a power source and to provide an input voltage to the light emitting diode driver, wherein said at least one light emitting diode of the first color configured to produce a first light output based on the first current level, and said at least one light emitting diode of the second color configured to produce a second light output based on the second current level, such that a combined light output of the first light output and the second light output is substantially constant.

12. The automotive lighting device according to claim 11, wherein said at least one light emitting diode of the first color comprises one or more blue emitting diodes and said at least one light emitting diode of the second color comprises one or more white emitting diodes.

13. The automotive lighting device according to claim 11, wherein the housing comprises a plurality of heat fins configured to thermally dissipate the heat generated by said light emitting diodes.

14. The automotive lighting device according to claim 11, wherein the housing comprises a plurality of tabs to facilitate mounting of the housing to the headlight fixture.

15. The automotive lighting device according to claim 11, wherein said switch comprises four single-pole, single-throw switches for providing four switch outputs, each switch output configured to provide a first value or a second value, and wherein said settings comprise a plurality of combinations of the first values and the second values from said switch outputs.

16. The automotive lighting device according to claim 15, wherein one of the combinations of the first values and the second values are provided to the first decoder and the second decoder, the first decoder configured to generate the first decoder output at least based on said one combination of the first values and the second values, the second decoder configured to generate the second decoder output at least based on said one combination of the first values and the second values.

17. The automotive lighting device according to claim 16, wherein said four switch outputs comprise a first switch output, a second switch output, a third switch output and a fourth switch output, wherein the first switch output, the second switch output and third switch output are provided to the first decoder and the second decoder, wherein
the first decoder is arranged to receive a plurality of first input voltage levels from a first voltage divider, the first decoder configured to generate the first decoder output at least based on the first input voltage levels and the first switch output, the second switch output and third switch output, and
the second decoder is arranged to receive a plurality of second input voltage levels from a second voltage divider, the second decoder configured to generate the second decoder output at least based on the second input voltage levels and the first switch output, the second switch output and third switch output.

18. The automotive lighting device controller according to claim 11, wherein a relative amount of light output between the first light output and the second light output is arranged to change based on a change from said one combination of the first values and the second values to another one of the combinations, and wherein said at least one light emitting diode of the first color comprises four blue light emitting diodes and said at least one light emitting diode of the second color comprises four white light emitting diodes, and wherein the combined light output has a color temperature, and a change in the relative amount of light output between the first light output and the second light output gives rise to a change in the color temperature.

19. The automotive lighting device according to claim 11, wherein said switch comprises four single-pole, single-throw switches for providing four switch outputs, each output switch configured to provide a first value or a second value, and wherein said settings comprise a plurality of combinations of the first values and the second values from said switch outputs, and wherein said at least one light emitting diode of the first color configured to produce a first light output of blue light, and said at least one light emitting diode of the second color configured to produce a second light output of white light, wherein a combined light output of the first light output and the second light output is substantially constant and wherein said settings are configured to provide up to nine different combinations of the first values and second values, each of the combinations gives rise to a different relative amount of light output between the first light output and a second light output.

20. An automotive lighting device comprising:
- at least one light emitting diode of a first color;
- at least one light emitting diode of a second color;
- a housing configured to mount thereon said at least one light emitting diode of the first color and said at least one light emitting diode of the second color, said housing configured to thermally dissipate heat generated by said light emitting diodes and also configured to be installed within a headlight fixture of an automobile;
- a switch having settings configurable to select one of a plurality of intensity levels associated with said at least one light emitting diode of the first color and configurable to select one of a plurality of intensity levels associated with said at least one light emitting diode of the second color;
- a first decoder in communication with said switch, the first decoder configured to generate a first decoder output associated with the selected intensity level of said at least one light emitting diode of the first color;
- a second decoder in communication with said switch, the second decoder configured to generate a second decoder output associated with the selected intensity level of said at least one light emitting diode of the second color; and
- a light emitting diode driver in communication with the first decoder and the second decoder and with said at least one light emitting diode of the first color and with said at least one light emitting diode of the second color, the driver configured to supply a first current level to said at least one light emitting diode of the first color based on the first decoder output of the first decoder and to supply a second current level to said at least one light emitting diode of the second color based on the second decoder output of the second decoder, wherein the first decoder is arranged to receive a plurality of first input voltage levels from a first voltage divider, the first decoder configured to generate the first decoder output at least based on one of the plurality of first input voltage levels, said one of the plurality of first input voltage levels selected by the first decoder based on said switch settings associated with said at least one light emitting diode of the first color, and the second decoder is arranged to receive a plurality of second input voltage levels from a second voltage divider, the second decoder configured to generate the second decoder output at least based on one of the plurality of second input voltage levels, said one of the plurality of second input voltage levels selected by the second decoder based on said switch settings associated with said at least one light emitting diode of the second color.

21. The automotive lighting device according to claim 20, wherein said switch is a multi-pole switch.

22. The automotive light device according to claim 20, wherein said switch comprises four single-pole, single-throw switches for providing four switch outputs, each switch output configured to provide a first value or a second value, and wherein said settings comprise a plurality of combinations of the first values and the second values from said switch outputs.

\* \* \* \* \*